(12) United States Patent
Kim

(10) Patent No.: US 8,922,614 B2
(45) Date of Patent: Dec. 30, 2014

(54) LIGHT SCANNING UNIT AND IMAGE FORMING APPARATUS INCLUDING THE SAME

(71) Applicant: Samsung Electronics Co., Ltd., Suwon (KR)

(72) Inventor: Wan-Chin Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 13/963,345

(22) Filed: Aug. 9, 2013

(65) Prior Publication Data

US 2014/0111591 A1  Apr. 24, 2014

(30) Foreign Application Priority Data

Oct. 24, 2012  (KR) .................. 10-2012-0118678

(51) Int. Cl.
| | |
|---|---|
| *B41J 15/14* | (2006.01) |
| *B41J 2/435* | (2006.01) |
| *B41J 27/00* | (2006.01) |
| *G02B 26/12* | (2006.01) |
| *G02B 26/10* | (2006.01) |

(52) U.S. Cl.
CPC .............. *G02B 26/10* (2013.01); *G02B 26/125* (2013.01); *G02B 26/124* (2013.01)
USPC ........... 347/241; 347/234; 347/248; 347/258; 347/259

(58) Field of Classification Search
USPC .......................... 347/241, 234, 248, 259, 258
See application file for complete search history.

(56) References Cited

U.S. PATENT DOCUMENTS

| | | | |
|---|---|---|---|
| 4,756,585 A * | 7/1988 | Kaneko et al. | ............. 359/218.1 |
| 6,141,118 A | 10/2000 | Yamawaki et al. | |
| 7,292,316 B2 * | 11/2007 | Kohno | ............................ 355/67 |
| 2004/0263979 A1 | 12/2004 | Kimura | |

FOREIGN PATENT DOCUMENTS

JP  2003-185955  7/2003

OTHER PUBLICATIONS

Extended European Search Report mailed Feb. 12, 2014 in related European Application No. 13190076.3.

* cited by examiner

*Primary Examiner* — Sarah Al Hashimi

(74) *Attorney, Agent, or Firm* — Staas & Halsey LLP

(57) ABSTRACT

A light scanning unit and an electrophotographic image forming apparatus are provided. The light scanning unit includes a light source emitting the light beams according to an image signal, an incident optical system including a flux-limiting element limiting the flux of light beams emitted by the light source, an optical deflector deflecting the light beams emitted by the light source in a main scanning direction, and an image forming optical system including a scanning optical element imaging the light beams deflected by the optical deflector on a scanning target surface, the light scanning unit forming an electrostatic latent image by scanning the light beams to the scanning target surface of the image bearing member. The scanning optical element of the scanning optical elements of the image forming optical system is eccentrically arranged from a central optical axis of the image forming optical system in a sub-scanning direction.

20 Claims, 10 Drawing Sheets

LIGHT SCANNING UNIT AND IMAGE FORMING APPARATUS INCLUDING THE SAME

CROSS-REFERENCE TO RELATED APPLICATIONS

This application is related to, and claims priority to, Korean Patent Application No. 10-2012-0118678, filed on Oct. 24, 2012, in the Korean Intellectual Property Office, the disclosure of which is incorporated herein in its entirety by reference.

BACKGROUND

1. Field

Exemplary embodiment of the present invention relate to a light scanning unit and an image forming apparatus including the same, and more particularly, to a light scanning unit and an image forming apparatus including the same, the light scanning unit improving a problem of multiple reflection of light beams in an image forming optical system.

2. Description of the Related Art

Electrophotographic image forming apparatuses such as laser printers, digital copiers, multifunctional printers (MFP) have a configuration in which an electrostatic latent image is formed by scanning light to a photosensitive medium by using a light scanning unit, the formed electrostatic latent image is transformed to a developed image by using a developer such as a toner, and the developed image is transferred onto a printing medium.

A light scanning unit employed by an image forming apparatus scans light beams to a main scanning direction by using an optical deflector such as a polygonal rotating mirror and a vibrating mirror, the apparatus including an incident optical system for incidence of the light beams to the optical deflector and an image forming optical system forming an image on a scanning target surface, that is, a photosensitive medium using the light beams scanned while being deflected by the optical deflector. However, when an optical axis of the incident optical system in a sub-scanning direction is identical to that of the image forming optical system in a sub-scanning direction, multiple reflected light beams occurring between an incident surface and an emitting surface of a scanning optical element (an element featuring a "fθ characteristic") of the image forming optical system are scanned to an effective image area of the scanning target surface, leading to deteriorated uniformity in density of an image. Conventionally, in an attempt to address such problems, reflection occurring between an incident surface and an emitting surface of a scanning optical element of an image forming optical system may be maximally suppressed by forming a non-reflective coating layer on the surfaces, or an optical axis of the scanning optical element may be separately disposed from an optical axis of an incident optical system to be eccentric in such a way that multiple reflected light beams avoid an effective image area of normal scanning light beams.

SUMMARY

Additional aspects and/or advantages will be set forth in part in the description which follows and, in part, will be apparent from the description, or may be learned by practice of the invention.

According to an exemplary embodiment of the present invention, a light scanning unit and an electrophotographic image forming apparatus including the light scanning unit are provided capable of being manufactured with low cost when forming a non-reflective coating layer on an incident and emitting surfaces of the light scanning unit, capable of preventing an increase of a beam spot diameter on an image forming plane and a deviation between beam spot diameters in an effective image area, which occur due to a deterioration of image forming characteristics of a normal image forming light beam when arranging a light axis of the light scanning unit to be eccentric from a light axis of an incident optical system.

According to an exemplary embodiment of the present invention, a light scanning unit is provided scanning light beams to a scanning target surface. The light scanning unit includes a light source emitting the light beams according to an image signal, an incident optical system including a flux-limiting element limiting the flux of light beams emitted by the light source, an optical deflector deflecting the light beams emitted by the light source in a main scanning direction, and an image forming optical system including one or a plurality of scanning optical elements imaging the light beams deflected by the optical deflector on the scanning target surface. At least one scanning optical element of the one or plurality of scanning optical elements of the image forming optical system is eccentrically arranged from a central optical axis of the image forming optical system in a sub-scanning direction and the flux-limiting element is eccentrically arranged from a central optical axis of the incident optical system in a sub-scanning direction in order to compensate for a deterioration of beam spot diameter occurring due to the scanning optical elements eccentrically arranged in the image forming optical system.

An eccentric direction of the flux-limiting element may be opposite to an eccentric direction of the scanning optical element eccentrically arranged in the image forming optical system.

The scanning optical element eccentrically arranged in the image forming optical system may be most adjacent to the scanning target surface among the one or a plurality of scanning optical elements of the image forming optical system.

An eccentric amount XS of the flux-limiting element in the sub-scanning direction and an eccentric amount XL of the scanning optical element eccentrically arranged in the image forming optical system may satisfy Equation (1):

$$-1.8 < \frac{X_L}{X_S} < -0.2. \qquad \text{Equation (1)}$$

The flux-limiting element may be eccentrically arranged in such a way that an incident angle θ of the light beams incident to the optical deflector satisfies Equation (2)

$$0.2 < |\theta| < 16 \qquad \text{Equation (2).}$$

The incident optical system may include a collimating lens collimating the light beams emitted by the light source as parallel light or convergent light and a cylindrical lens focusing the light beams passing through the collimating lens onto a deflecting surface of the optical deflector in the sub-scanning direction.

The flux-limiting element may be arranged in one of a position between the light source and the collimating lens, a position between the collimating lens and the cylindrical lens, and a position between the cylindrical lens and the optical deflector.

The image forming optical system may include a first scanning optical element that is adjacent to the optical deflector and has a refractive power of 0 in the sub-scanning direction and a second scanning optical element that images the light beams passing through the first scanning optical element on the scanning target surface and has a refractive power in the sub-scanning direction, the refractive power being needed in the image forming optical system. The scanning optical element eccentrically arranged in the image forming optical system may be the second scanning optical element.

The one or a plurality of scanning optical elements may include fθ characteristics of imaging the light beams deflected by the optical deflector on the scanning target surface at a constant velocity.

According to an exemplary embodiment of the present invention, a light scanning unit scanning light beams to a scanning target surface is provided. The light scanning unit includes a light source emitting the light beams according to an image signal, a collimating lens collimating the light beams emitted by the light source as parallel light or convergent light, a cylindrical lens focusing the light beams passing through the collimating lens onto a deflecting surface of the optical deflector in a sub-scanning direction, an optical deflector deflecting the light beams emitted by the light source in a main scanning direction, a flux-limiting element arranged in one of a position between the light source and the collimating lens, a position between the collimating lens and the cylindrical lens, and a position between the cylindrical lens and the optical deflector and limiting the flux of light beams emitted by the light source, and one or a plurality of scanning optical elements imaging the light beams deflected by the optical deflector on the scanning target surface. A scanning optical element that is closest to the scanning target surface among the one or a plurality of scanning optical elements may be eccentrically arranged from a central light axis of an image forming optical system of the light scanning unit in a sub-scanning direction and the flux-limiting element may be eccentrically arranged from a central light axis of an incident optical system in a sub-scanning direction opposite to an eccentric direction of the scanning optical element eccentrically arranged in the image forming optical system.

According to an exemplary embodiment of the present invention, an electrophotographic image forming apparatus is provided. The electrophotographic image forming apparatus includes an image bearing member, a light scanning unit including a light source emitting the light beams according to an image signal, an incident optical system including a flux-limiting element limiting the flux of light beams emitted by the light source, an optical deflector deflecting the light beams emitted by the light source in a main scanning direction, and an image forming optical system including one or a plurality of scanning optical elements imaging the light beams deflected by the optical deflector on a scanning target surface, the light scanning unit forming an electrostatic latent image by scanning the light beams to the scanning target surface of the image bearing member, and a developing unit developing the electrostatic latent image formed on the image bearing member by supplying a toner thereto. At least one scanning optical element of the one or plurality of scanning optical elements of the image forming optical system is eccentrically arranged from a central optical axis of the image forming optical system in a sub-scanning direction and the flux-limiting element is eccentrically arranged from a central optical axis of the incident optical system in a sub-scanning direction in order to compensate for a deterioration of beam spot diameter occurring due to the scanning optical elements eccentrically arranged in the image forming optical system.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION

Figure 1:
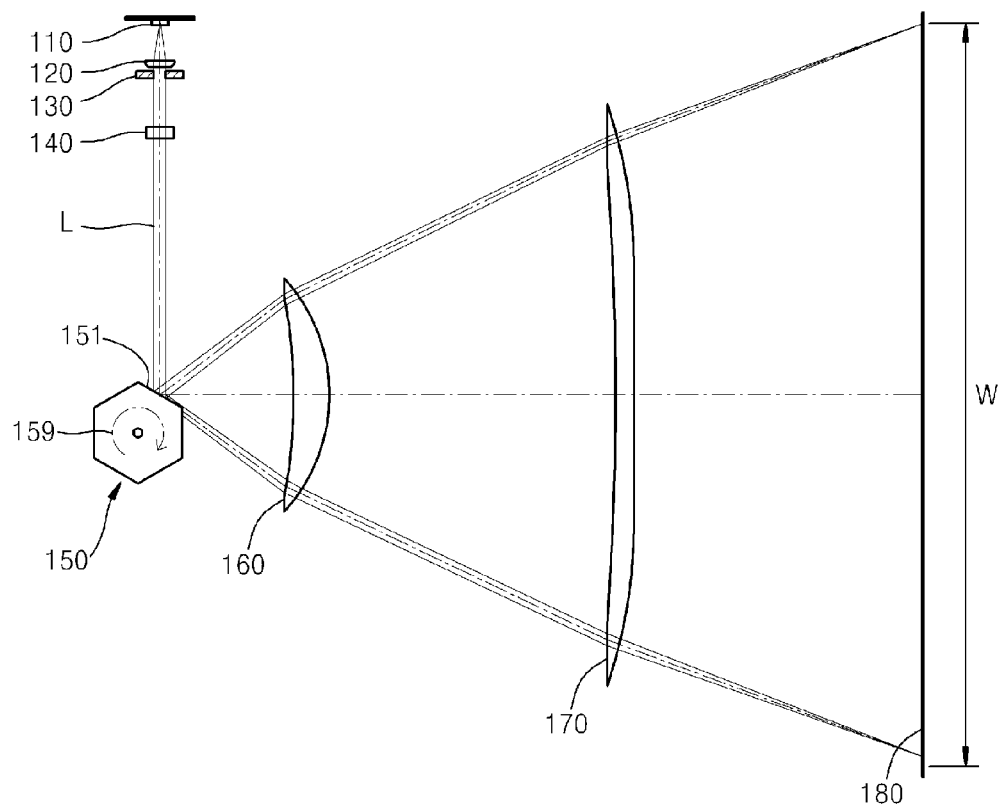
FIG. 1 is a schematic view illustrating an arrangement of optical elements along a main scanning plane of a light scanning unit according to an exemplary embodiment.

Reference will now be made in detail to the embodiments, examples of which are illustrated in the accompanying drawings, wherein like reference numerals refer to the like elements throughout. The embodiments are described below to explain the present invention by referring to the figures.

Exemplary embodiments of the present invention are described with reference to the accompanying drawings, in which like reference numerals refer to the like elements throughout. A size and/or a thickness of an element may be exaggerated for clarity of description.

Figure 2:
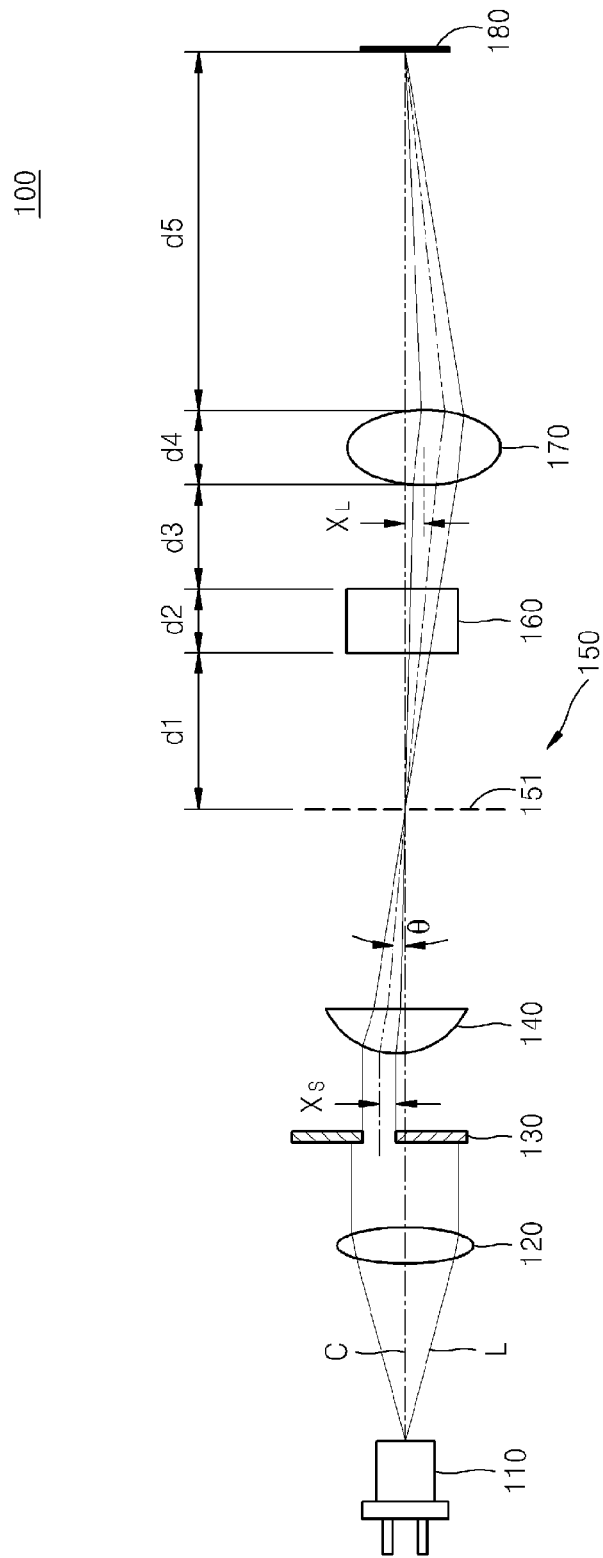
FIG. 2 is schematic view illustrating an exemplary optical configuration of a light scanning unit in a view of a sub-scanning plane.

FIG. 1 is a schematic view illustrating an arrangement of optical elements along a main scanning plane of a light scanning unit 100 according to an embodiment of the present invention, and FIG. 2 is a schematic view illustrating an arrangement of optical elements along a sub-scanning plane of the light scanning unit 100 of FIG. 1. In FIG. 2, to illustrate an exemplary light path, an exemplary deflected reflection performed by an optical deflector 150 is not illustrated.

As illustrated in FIG. 1, a main scanning direction may be defined as a deflection direction in which light beams L are deflected by a rotation 159 of the optical deflector 150. A proceeding direction of a beam spot imaged on a scanning target surface 180 may be considered as the main scanning direction. A main scanning plane may be defined as a plane on which the light beams L deflected by the rotation 159 of the optical deflector 150 are swept. A main scanning plane with respect to the light beams L is parallel to a proceeding direction and simultaneously with a main scanning direction of the light beams L and is at right angles to a rotation axis of the optical deflector 150. An exemplary sub-scanning direction is a normal line to the main scanning plane, and corresponds to a direction in which an outer circumferential surface of a photosensitive drum (see, for example, 210 of FIG. 15), that is, the scanning target surface 180, may be transferred by a rotation of the photosensitive drum. The sub-scanning direction may be perpendicular to the proceeding direction and simultaneously with the main scanning direction of the light beams L. A sub-scanning plane may be a plane at right angles to the main scanning direction and parallel to the proceeding direction and simultaneously with the sub-scanning direction of the light beams L.

As illustrated in FIGS. 1 and 2, the light scanning unit 100 includes a light source 110 that emits light beams L modulated according to an image signal corresponding to image information. A laser diode may be used for a light source 110.

The light beams L emitted from the light source 110 may be deflected by the optical deflector 150 and scanned. The optical deflector 150 may be, as an example, a polygonal rotating mirror with a plurality of reflecting surfaces, that is, deflecting surfaces 151 rotating around a rotation axis. The optical deflector 150 may be a microelectromechanical system (MEMS) mirror.

An incident optical system may be provided in a light path between the light source 110 and the optical deflector 150. The incident optical system may include a collimating lens 120 collimating the light beams L, a flux-limiting element 130, and a cylindrical lens 140.

The collimating lens 120 is a condensing lens collimating the light beams L emitted from the light source 110 into parallel light beams or convergent light beams.

The flux-limiting element 130 limits cross-sections that includes diameters and shapes of fluxes of the light beams L to provide a certain beam diameter and may be a slit with an opening. The flux-limiting element 130 may be, as illustrated in FIG. 2, arranged in such a way that a center of the opening thereof is deviated in a sub-scanning direction with respect to a central optical axis C of the light scanning unit 100 by Xs.

Not considering the flux-limiting element 130, an optical axis of the collimating lens 120 and an optical axis of the cylindrical lens 140 may be arranged to be identical to a central light beam of the light beams L emitted from the light source 110, in which the arranged optical axes become the central optical axis C of the light scanning unit 100. The central optical axis C of the light scanning unit 100 may be perpendicular to the rotation axis of the optical deflector 150. That is, the light beams L, in a state where the flux-limiting element 130 is not eccentric or is omitted, may be vertically incident to deflecting surface 151 of the optical deflector 150 in a view of the sub-scanning plane. However, as the flux-limiting element 130 may deviate from the central optical axis toward the sub-scanning direction by Xs, the light beams L out of the center of the opening of the flux-limiting element 130 may be incident to a location out of an apex of the cylindrical lens 140 in the view of the sub-scanning plane, and accordingly, the light beams L passing through the center of the opening of the flux-limiting element 130 pass through the cylindrical lens 140 and are incident to the deflecting surface 151 of the optical deflector 150 with a certain angle. An eccentric amount $X_S$ of the flux-limiting element 130 toward the sub-scanning direction may be determined within a range of compensating an error of a beam diameter or a deterioration of a curvature of image field occurring due to eccentrically disposing an image forming optical system as described later. The eccentric amount $X_S$ of the flux-limiting element 130 toward the sub-scanning direction may be determined in such a way that the light beams L incident to the deflecting surface 151 of the optical deflector 150 satisfy Equation 1 as follows:

$$0.2 < |\theta| 1.6 \qquad \text{Equation (1)}.$$

In Equation 1, $\theta$ indicates incidence angles of the light beams L incident to the deflecting surface of the optical deflector 150.

The eccentric amount $X_S$ of the flux-limiting element 130 toward the sub-scanning direction may vary not only with optical characteristics or arrangement of optical elements of the incident optical system, but also with optical characteristics or arrangement of optical elements of the image forming optical system, and may be determined to satisfy a certain relation with an eccentric amount $X_L$ of a second light scanning optical element 170 toward the sub-scanning direction. As an example, the eccentric amount $X_S$ of the flux-limiting element 130 toward the sub-scanning direction may be within a range between 0.2 to 1.2 mm.

The cylindrical lens 140 may be an anamorphic lens forming approximately a linear image of the light beams L on the deflecting surface 151 of the optical deflector 150 by focusing the light beams L in a direction corresponding to the sub-scanning direction.

An image forming optical system may be provided in the light path between the optical deflector and the scanning target surface 180 The image forming optical system forms an image of the light beams L deflected by the optical deflector 150 on the scanning target surface 180. Such the image forming optical system may include one or a plurality of troidal lenses having fθ characteristics of adjusting in such a way that the light beams L are scanned to the scanning target surface 180 at a constant velocity.

As an example, the image forming optical system may include a first scanning optical element 160 and the second scanning optical element 170. The first scanning optical element 160 may be designed to have positive refractive power in the main scanning direction and approximately 0 of refractive power in the sub-scanning direction. The second scanning optical element 170 may be designed to have almost the entire refractive power in the sub-scanning direction needed in the image forming optical system.

Normal light beams passing through the second scanning optical element 170 may be imaged on the scanning target surface 180 and form an image. Since the second scanning optical element 170 is the most adjacent element to the scanning target surface 180 in the image forming optical system, a ghost formed on the scanning target surface 180 due to light beams reflected inside the second scanning optical element 170 (hereinafter, referred to as multiple reflected light beams) has a greater effect on image quality than ghosts occurring due to other multiple reflected light beams that occurred in other optical elements. Accordingly, the second scanning optical element 170 may be arranged in such a way that apexes (center points) of incident and emitting surfaces are to be eccentric in the sub-scanning direction (see, for example, direction B in FIG. 3) with respect to the central optical axis C of the image forming optical system.

The eccentric amount $X_L$ of the second scanning optical element 170 in the sub-scanning direction may vary with a distance d4 (see, for example, FIG. 2) between incident and emitting surfaces of the second scanning optical element 170, the refractive power of the incident and emitting surfaces of the second scanning optical element 170, and a distance d5 (see, for example, FIG. 2) between the second scanning optical element 170 and the scanning target surface 180. The eccentric amount $X_L$ of the second scanning optical element 170 in the sub-scanning direction may be experimentally obtained by, as an example, gradually allowing the second scanning optical element 170 to be eccentric until the ghost occurring due to multiple reflected light beams is out of an effective image area of normal light beams in a state where other optical elements of the light scanning unit 100, except the second scanning optical element 170, are arranged on the central optical axis C.

Since there may occur a beam diameter deviation or a deterioration of a curvature of image field according to eccentrically arranging the second scanning optical elements 170 of the image forming optical system, the flux-limiting element 130 may be eccentrically arranged in a direction opposite to the eccentric direction B of the second scanning optical element 170 in the sub-scanning direction to compensate for the deviation or deterioration. When the eccentric amount $X_L$ of the second scanning optical element 170 in the sub-scanning direction is determined, a ratio of the eccentric amount $X_L$ of the second scanning optical element 170 in the sub-scanning direction to the eccentric amount $X_S$ of the flux-limiting element 130 in the sub-scanning direction, that is, an eccentric ratio of $X_L/X_S$ may be determined to satisfy Equation 2 as follows:

$$-1.8 < \frac{X_L}{X_S} < -0.2. \quad \text{Equation (2)}$$

In Equation 2, a negative sign indicates that the eccentric direction B of the second scanning optical element 170 in the sub-scanning direction and an eccentric direction A of the flux-limiting element 130 in the sub-scanning direction are opposite to each other.

A flux-limiting element 130 may be eccentrically arranged together with the second scanning optical element 170, thereby not only preventing a deterioration of image quality occurring due to multiple reflected light beams but also preventing a deterioration of image quality occurring due to an eccentric arrangement of the second scanning optical element 170.

By eccentrically arranging the second scanning optical element 170, a ghost occurring due to multiple reflected light beams occurring in the second scanning optical element 170 may be prevented.

A reflecting mirror (not shown) may be provided inside the image forming optical system or between the image forming optical system and the scanning target surface 180 and capable of properly adjusting a light path.

Figure 3:
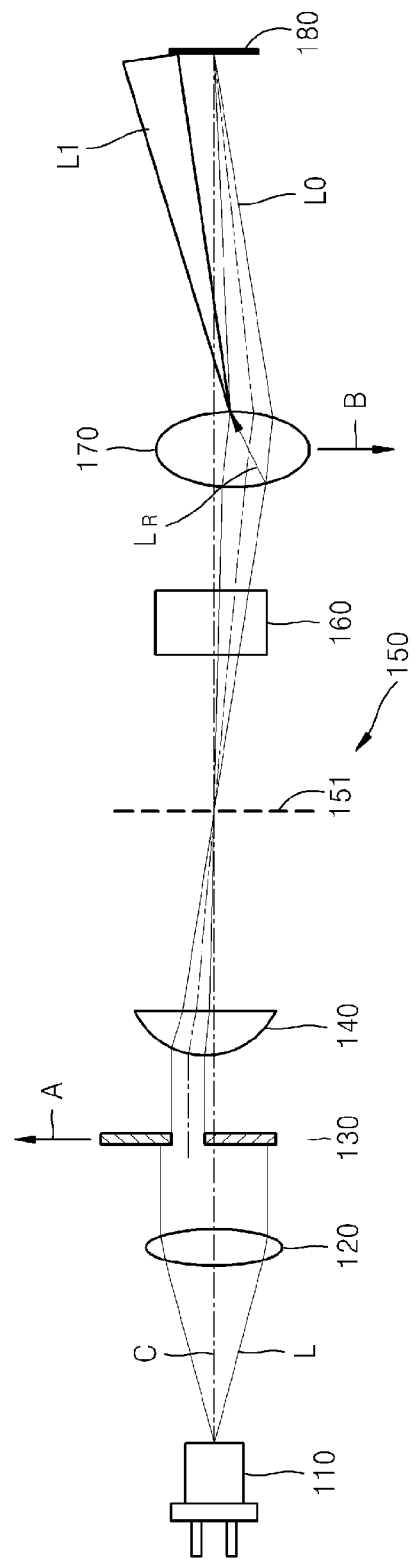
FIG. 3 is a schematic view illustrating an exemplary light path of multiple reflected light beams in a light scanning unit.
Figure 4:
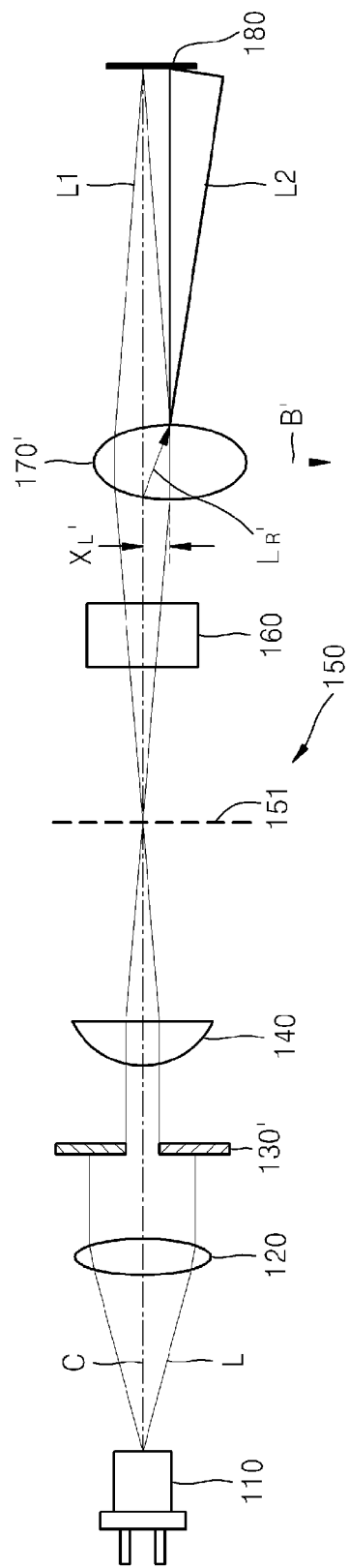
FIG. 4 is a schematic view illustrating an exemplary light scanning unit of a comparative example.

Exemplary operations of light scanning units are illustrated in FIGS. 3 and 4.

FIG. 3 illustrates the second scanning optical element 170 in the light scanning unit 100, a normal light beam according to the eccentric arrangement of the second scanning optical element 170, and multiple (multiple) reflected light beams at the second scanning optical element 170.

The light beams L emitted by the light source 110 may be focused at the collimating lens 120 as parallel light, and cross-sections of flux of the light beams L may be defined by a shape of the opening of the flux-limiting element 130 while passing through the flux-limiting element 130 eccentrically arranged in the sub-scanning direction (the direction A). The light beams L passing through the flux-limiting element 130 pass through the cylindrical lens 140 and are focused on the deflecting surface 151 of the optical deflector 150 in the sub-scanning direction. The light beams L incident to the optical deflector 150 are deflected by the deflecting surface 151 of the optical deflector 150, pass through the first scanning optical element 160 and the second scanning optical element 170 eccentrically arranged in the sub-scanning direction (the direction B), and are imaged on the scanning target surface 180.

Since the flux-limiting element 130 may be eccentrically arranged in the sub-scanning direction (the direction A), the light beams L incident to the cylindrical lens 140 are incident to a position out of the apex of the cylindrical lens 140 and, accordingly, are slantly incident to the deflecting surface 151 of the optical deflector 150 in a view of a sub-scanning plane, pass through the first scanning optical element 160, and are slantly incident to the second scanning optical element 170. A central line of the light beams L emitted by the light source 110, the optical axis of the collimating lens 120 of the incident optical system, and the optical axis of the cylindrical lens 140 may be designed based on optical systems arranged parallel to a central optical axis but provided as inclined optical systems due to the eccentric arrangement of the flux-limiting element 130.

The light beams L are slantly incident to the second scanning optical element 170, thereby suppressing an increasing deviation of a beam spot diameter and a curvature of image field occurring due to eccentrically arranging the second scanning optical element 170 in the sub-scanning direction (the direction B).

As the second scanning optical element 170 may be eccentrically arranged in the sub-scanning direction (the direction B), a ghost occurring due to multiple reflected light beams occurring in the second scanning optical element 170 is not in the effective image area of the normal light beams, thereby preventing a deterioration of image quality due to the multiple reflected light beams.

Eccentric amounts of a flux-limiting element and a second scanning optical element are described with reference to exemplary detailed design data of the light scanning unit 100.

An exemplary case where a sub-scanning magnification of the image forming optical system (e.g., the second scanning optical element) is relatively low, referring to Tables 1 to 3 and 5 to 9 is described.

Table I illustrates an exemplary layout of the entire optical systems of the light scanning unit 100 according to an exemplary embodiment.

TABLE 1

| Configuration of the light scanning unit fθ coefficient (mm/rad) | | |
|---|---|---|
| fθ coefficient | k | 228 |
| Effective scanning width | W | 310 |
| Wavelength and refractive indexes | | |
| Used wavelength | λ(nm) | 780 |
| Refractive index of first scanning optical element | n1 | 1.53 |
| Refractive index of second scanning optical element | n2 | 1.53 |
| Layout of image forming optical system (mm) | | |
| Deflecting surface of optical deflector to incident surface of first scanning optical element | d1 | 52.2 |
| Incident surface of first scanning optical element to emitting surface of first scanning optical element | d2 | 12.5 |
| Emitting surface of first scanning optical element to incident surface of second scanning optical element | d3 | 122.5 |
| Incident surface of second scanning optical element to emitting surface of second scanning optical element | d4 | 7.5 |
| Emitting surface of second scanning optical element to scanning target surface | d5 | 110.5 |

In Table 1, the effective scanning width W is illustrated in FIG. 1, and distances d1, d2, d3, d4, and d5 in arrangement of image forming optical system are as illustrated in FIG. 2.

An aspheric-surficial shape of incident/emitting surfaces of each of first scanning optical elements 160ab and 160cd and second scanning optical elements 170a, 170b, 170c, and 170d may be expressed as Equation 3:

$$z = \frac{C_1|y|^2}{1+\sqrt{1-(1+K)C_1^2|y|^2}} +$$

$$\sum_n A_n|y|^n + \frac{C_2(1+\Sigma_n B_n|y|^n)x^2}{1+\sqrt{1-C_2^2(1+\Sigma_n B_n|y|^n)x^2}}.$$

Equation (3)

In Equation 3, z indicates a distance between an apex of a scanning optical element and an optical axis, x indicates a distance in a direction perpendicular to the optical axis, y indicates a distance in a main scanning direction from the apex of the scanning optical element, K indicates a conic constant, $A_n$ indicates an aspheric surface coefficient of the main scanning direction, and $B_n$ indicates an aspheric surface coefficient of a sub-scanning direction. $C_1$ indicates a reciprocal number of a curvature radius R of the main scanning direction, and $C_2$ indicates a reciprocal number of a curvature radius r of the sub-scanning direction. When a sub-scanning magnification of the image forming optical system (e.g., the second scanning optical element) is relatively small, numerical values of coefficients of an aspheric surface equation as illustrated in Equation 3 are given in Table 2. A coefficient not given in Table 2 may be considered as zero.

TABLE 2

| | | | Main scanning shape [mm] | | Sub-scanning shape [mm] |
|---|---|---|---|---|---|
| First lens incident surface | Light source side | R | −1.814E+02 | r | 0 |
| | | A3 | −2.558E−06 | B3 | 0 |
| | | A4 | 4.455E−07 | B4 | 0 |
| | | A5 | 1.025E−21 | B5 | 0 |
| | | A6 | −7.004E−11 | B6 | 0 |
| | | A7 | −1.550E−28 | B7 | 0 |
| | | A8 | 3.436E−15 | B8 | 0 |
| | | A9 | 2.591E−45 | B9 | 0 |
| | | A10 | −4.252E−30 | B10 | 0 |
| | Opposite side of light source | R | −1.814E+02 | r | 0 |
| | | A3 | 1.037E−06 | B3 | 0 |
| | | A4 | 3.639E−07 | B4 | 0 |
| | | A5 | −3.657E−23 | B5 | 0 |
| | | A6 | −8.629E−11 | B6 | 0 |
| | | A7 | 1.255E−28 | B7 | 0 |
| | | A8 | 4.839E−15 | B8 | 0 |
| | | A9 | 2.609E−45 | B9 | 0 |
| | | A10 | −2.192E−31 | B10 | 0 |
| First lens emitting surface | Light source side | R | −7.473E+01 | r | 0 |
| | | A3 | −1.957E−06 | B3 | 0 |
| | | A4 | 4.328E−07 | B4 | 0 |
| | | A5 | 1.191E−21 | B5 | 0 |
| | | A6 | 2.952E−11 | B6 | 0 |
| | | A7 | 1.850E−30 | B7 | 0 |
| | | A8 | −3.506E−15 | B8 | 0 |
| | | A9 | 6.479E−46 | B9 | 0 |
| | | A10 | −1.919E−30 | B10 | 0 |
| | Opposite side of light source | R | −7.473E+01 | r | 0 |
| | | A3 | 9.762E−07 | B3 | 0 |
| | | A4 | 3.840E−07 | B4 | 0 |
| | | A5 | −1.456E−24 | B5 | 0 |
| | | A6 | 1.784E−11 | B6 | 0 |
| | | A7 | 4.423E−29 | B7 | 0 |
| | | A8 | −8.383E−15 | B8 | 0 |
| | | A9 | 6.524E−46 | B9 | 0 |
| | | A10 | −2.907E−30 | B10 | 0 |
| Second lens incident surface | Light source side | R | −1.206E+03 | r | −1.122E+02 |
| | | A3 | −1.170E−07 | B3 | −3.295E−07 |
| | | A4 | 3.549E−08 | B4 | 2.132E−09 |
| | | A5 | 1.928E−23 | B5 | 9.951E−11 |
| | | A6 | −2.939E−12 | B6 | −6.969E−13 |
| | | A7 | 7.422E−31 | B7 | −3.581E−15 |
| | | A8 | 1.645E−16 | B8 | 3.728E−16 |
| | | A9 | 1.295E−42 | B9 | −3.279E−17 |
| | | A10 | −2.248E−21 | B10 | 4.357E−21 |

TABLE 2-continued

| | | | Main scanning shape [mm] | | Sub-scanning shape [mm] |
|---|---|---|---|---|---|
| | Opposite side of light source | R | −1.206E+03 | r | −1.122E+02 |
| | | A3 | −4.002E−08 | B3 | −1.851E−06 |
| | | A4 | 2.700E−08 | B4 | −5.585E−07 |
| | | A5 | 7.573E−24 | B5 | 1.775E−08 |
| | | A6 | −1.490E−12 | B6 | −6.571E−11 |
| | | A7 | 8.437E−31 | B7 | −6.102E−13 |
| | | A8 | 3.956E−17 | B8 | 3.786E−17 |
| | | A9 | 1.304E−42 | B9 | −5.792E−18 |
| | | A10 | −2.073E−22 | B10 | 2.621E−21 |
| Second lens emitting surface | Light source side | R | −4.841E+03 | r | −2.770E+01 |
| | | A3 | −5.151E−08 | B3 | −2.601E−06 |
| | | A4 | −5.520E−08 | B4 | 7.262E−08 |
| | | A5 | 1.358E−10 | B5 | −5.748E−10 |
| | | A6 | 8.614E−13 | B6 | −4.800E−12 |
| | | A7 | −1.708E−14 | B7 | 1.063E−13 |
| | | A8 | 1.233E−16 | B8 | −2.264E−17 |
| | | A9 | −1.539E−33 | B9 | −9.783E−18 |
| | | A10 | 1.645E−30 | B10 | 5.120E−20 |
| | Opposite side of light source | R | −4.841E+03 | r | −2.770E+01 |
| | | A3 | −4.627E−09 | B3 | −2.557E−06 |
| | | A4 | −6.977E−08 | B4 | 7.138E−08 |
| | | A5 | 3.381E−10 | B5 | −7.838E−10 |
| | | A6 | 2.580E−13 | B6 | 3.787E−13 |
| | | A7 | −1.184E−14 | B7 | 6.048E−14 |
| | | A8 | 4.035E−17 | B8 | 1.030E−16 |
| | | A9 | 2.774E−34 | B9 | −8.758E−18 |
| | | A10 | −3.542E−30 | B10 | 4.417E−20 |

In Table 2, aspheric surface coefficients are illustrated as being divided on the basis of a center axis of the scanning optical element into light source side coefficients close to a light source and coefficients on an opposite side of the light source. That is, referring to FIG. 1, in a view of a main scanning plane, a light beam section close to the light source 110 corresponds to the light source side and a light beam section distant from the light source 110 corresponds to the opposite side of the light source 110.

In case of a light scanning unit including an image forming optical system designed as illustrated in Table 2, eccentric amounts of a flux-limiting element and a second scanning optical element may be as illustrated in Table 3.

TABLE 3

| A case where a sub-scanning magnification of a image forming optical system is relatively low | |
|---|---|
| Sub-scanning magnification of entire optical system | 3.24 |
| Sub-scanning magnification of image forming optical system | 0.58 |
| Magnification of incident optical system | 5.59 |
| Eccentric amount $X_L$ of second scanning optical element | −1.00 |
| Eccentric amount $X_S$ of flux-limiting element | 0.70 |
| Eccentric ratio of $X_L/X_S$ | −1.43 |

As illustrated in Table 3, since the eccentric amount $X_L$ of the second scanning optical element 170 in the sub-scanning direction is −1.00 mm and the eccentric amount $X_S$ of the flux-limiting element 130 in the sub-scanning direction is 0.70 mm, the eccentric ratio of $X_L/X_S$ is −1.43, which may be s considered as satisfying Equation 2 as described above.

Figure 5:
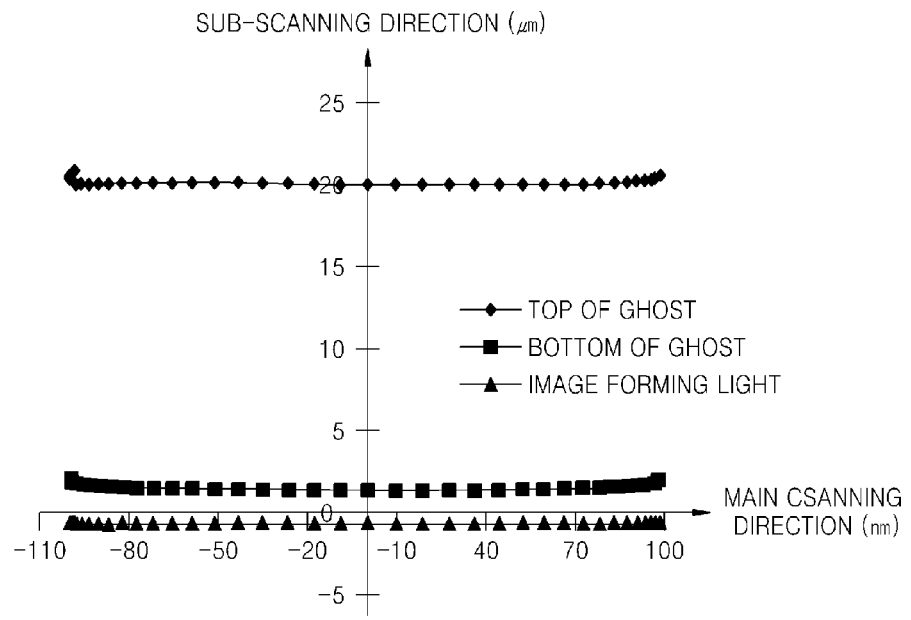
FIGS. 5 to 7 illustrate exemplary beam spot diameter characteristics of a light scanning unit.

FIG. 5 illustrates exemplary positions of normal image forming light beams and light beams reflected between surfaces in the second scanning optical element 170 on image forming plane when the light scanning unit 100 includes an optical configuration as given in Tables 1 to 3. In FIG. 5, a horizontal axis indicates positions of beam spots on a scanning target surface in a main scanning direction and a vertical axis indicates positions of beam spots on the scanning target surface in a sub-scanning direction. In FIG. 5, a top of a ghost indicates a top margin of the ghost occurring due to multiple reflected light beams between surfaces in the second scanning optical element 170 and a bottom of the ghost indicates a bottom margin of the ghost. Referring to FIG. 5, when a scanning line formed by a normal image forming light beam is on a reference position 0 in a sub-scanning direction, it is possible to recognize that the ghost occurring due to the multiple reflected light beams is within a range of about 2 to 20 μm in the sub-scanning direction. That is, FIG. 5 shows that the light beams reflected between surfaces in the second scanning optical element 170 fully avoid an image forming position of the normal image forming light beams.

Figure 6:
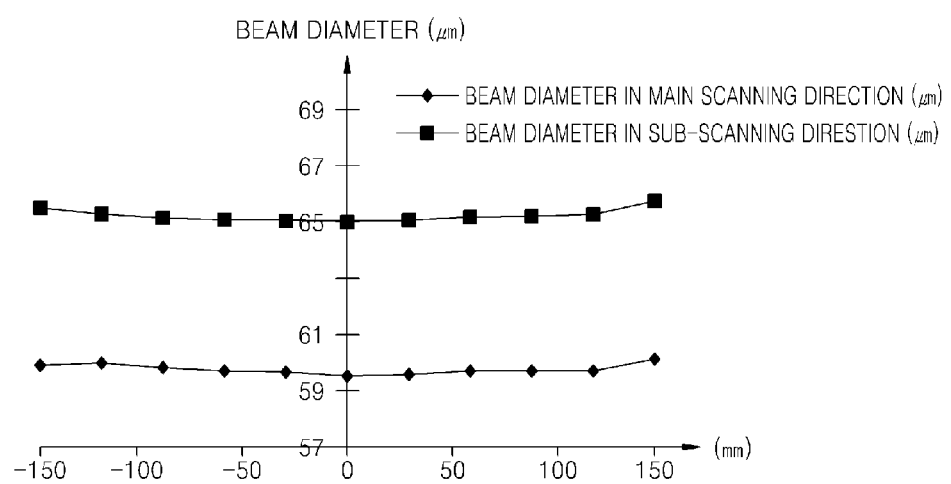
Figure 7:
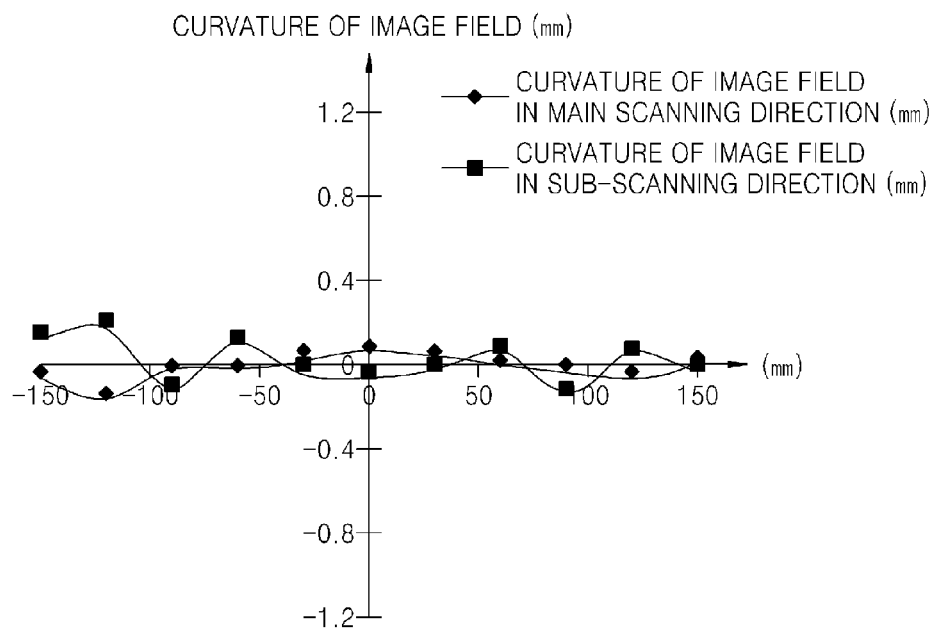

FIGS. 6 and 7 are graphs illustrating exemplary beam spot diameter characteristics of the light scanning unit 100 with an optical configuration as given in Tables 1 to 3.

FIG. 6 illustrates diameters of a beam spot in a main scanning direction and a sub-scanning direction, the beam spot forming a scanning line along the main scanning direction of the scanning target surface in the light scanning unit 100. In FIG. 6, a horizontal axis indicates positions of the beam spot on the scanning target surface in the main scanning direction, and a vertical axis indicates the diameter of the beam spot. Referring to FIG. 6, the light scanning unit 100 according to an exemplary embodiment may have a deviation between beam diameters of the beam spot is within approximately 1 μm over an area in the main scanning direction.

FIG. 7 illustrates exemplary curvatures of image field of a beam spot in the main scanning direction and the sub-scanning direction, the beam spot imaged along the main scanning direction of the scanning target surface in the light scanning unit 100. In FIG. 7, a horizontal axis indicates positions of the beam spot on the scanning target surface in the main scanning direction, and a vertical axis indicates a size of the curvature of image field of the beam spot. Referring to FIG. 7, the light scanning unit 100 may have a deviation between the curvatures of image field in the main scanning direction, and the sub-scanning direction may be approximately 0.5 mm or less on the basis of a designed image forming plane.

Figure 8:
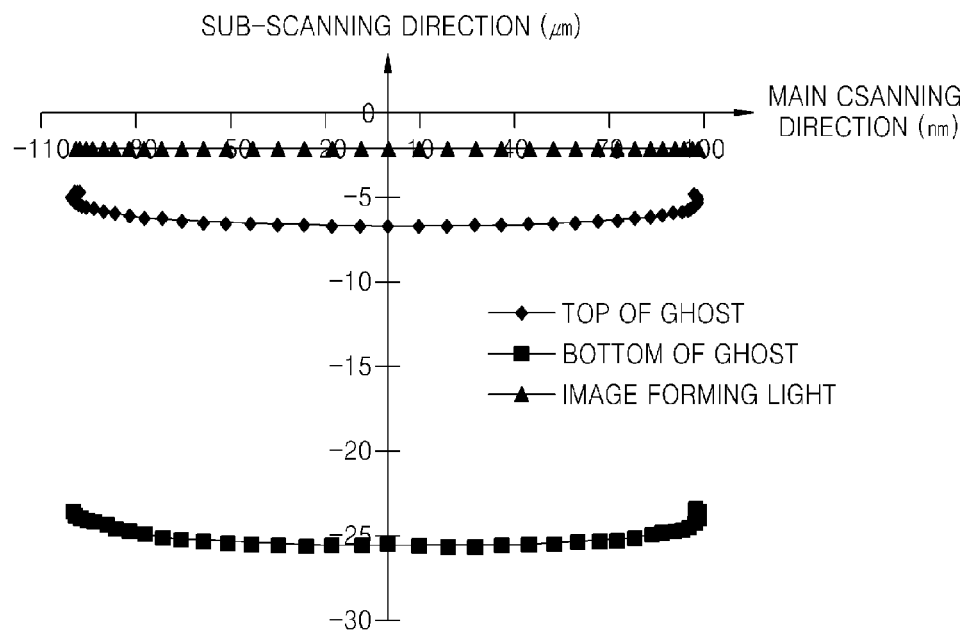
FIGS. 8 to 10 illustrate exemplary beam spot diameter characteristics of a light scanning unit.
Figure 9:
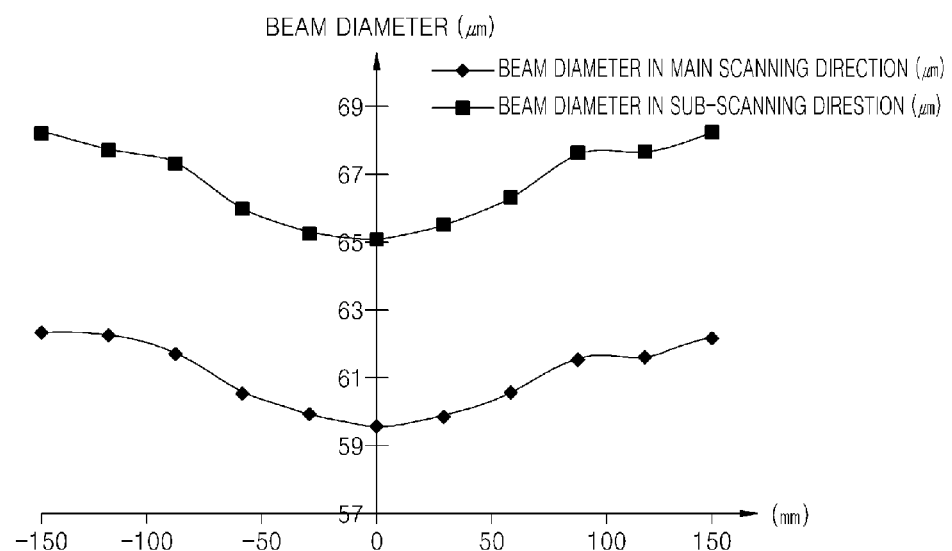
Figure 10:
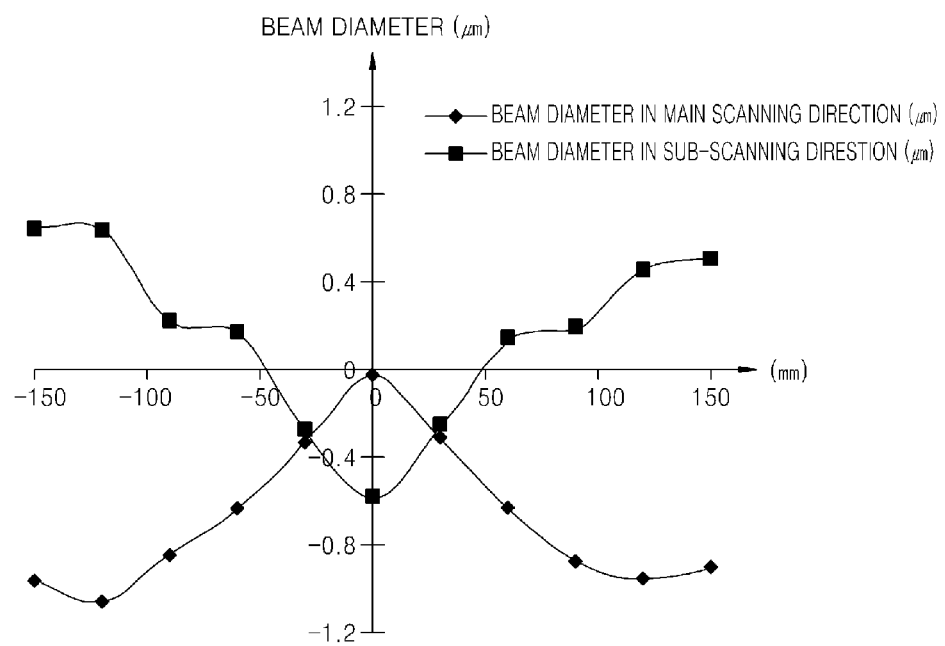

FIG. 8 illustrates exemplary positions of normal image forming light beams and light beams reflected between surfaces in a light scanning unit according to a comparative example, and FIGS. 9 and 10 are graphs illustrating exemplary beam spot characteristics of the light scanning unit according to the comparative example.

As described referring to FIG. 4, in an exemplary case of the light scanning unit according to the comparative example, to allow multiple reflected light beams to avoid an effective image area, only a second scanning optical unit 170' (see, for example, FIG. 4) becomes eccentric in a sub-scanning direction, and a center of an opening of a flux-limiting element 130' (see, for example, FIG. 4) is in accord with a central optical axis C of an incident optical system. That is, an optical design of the comparative example may be obtained when an eccentric amount of the flux-limiting element 130' is 0 instead of 0.70 mm, that is the eccentric amount $X_S$ of the flux-limiting element in Table 3, and other design indexes are values as given in Tables 1 to 3.

Referring to FIG. 8, light beams reflected between surfaces in the second scanning optical element 170' avoid an image forming position of normal image forming light beams also in the comparative example. However, referring to FIGS. 9 and 10, in a case of the comparative example, due to an effect of eccentrically arranging the second scanning optical element 170' with respect to the central optical axis C, a deviation of beam diameters in an image area is 4 μm, and a curvature of image field in an effective scanning area is increased as 1 mm or more in a main scanning direction and a sub-scanning direction.

That is, in a case of the light scanning unit according to the comparative example, although a ghost occurring due to multiple reflected light beams avoids the effective image area, the deviation between beam diameters is 4 μm, and the curvature of image field is 1 mm or more. However, in an exemplary case of the light scanning unit 100, the eccentric ratio $X_L/X_S$ of the second scanning optical element 170 to the flux-limiting element 130 is −1.43, thereby allowing the ghost occurring due to multiple reflected light beams to avoid the effective image area and reducing the deviation between beam diameters and the curvature of image field to 1 μm and 0.4 mm or less, respectively.

In other words, as illustrated in FIGS. 8 and 10, in an exemplary case of the light scanning unit according to the comparative example, though it is possible to prevent a ghost occurring due to multiple reflected light beams, the deviation between beam diameters and a deterioration of the curvature of image field characteristics is increased. However, as illustrated in FIGS. 5 to 7, in a case of the light scanning unit 100, the flux-limiting element 130 is eccentrically arranged within a certain range as illustrated in Equations 1 and 2 together with the second scanning optical element 170, thereby not only avoiding the ghost occurring due to multiple reflected light beams, but also greatly improving the deviation between beam diameters and the curvature of image field characteristics.

Figure 11:
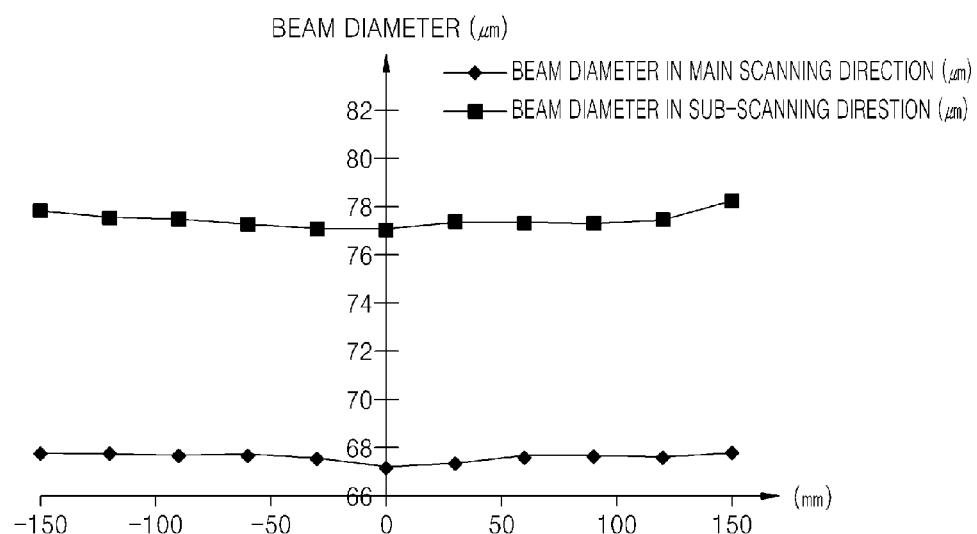
FIGS. 11 and 12 illustrate exemplary beam spot diameter characteristics of a light scanning unit according to an embodiment.
Figure 12:
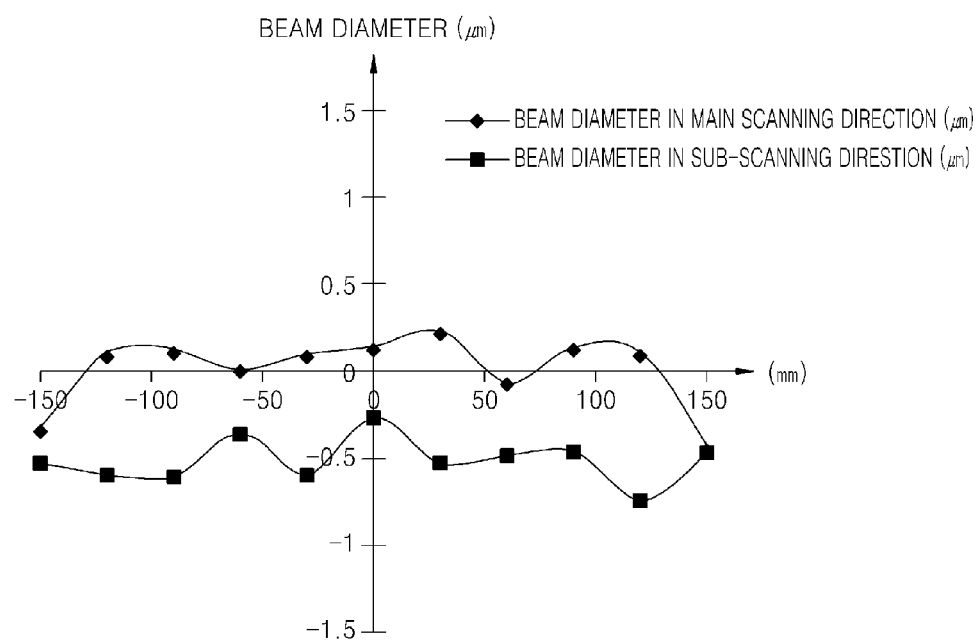

An exemplary case is described where the a sub-scanning magnification of the image forming optical system of the light scanning unit 100 is relatively high, with reference to Tables 1, 4, and 5, and FIGS. 11 and 12.

When the sub-scanning magnification of the image forming optical system is relatively high, values of coefficients in the aspheric surface equation as illustrated in Equation 3 are given in the following Table 4. A coefficient not given in Table 4 is considered as 0.

TABLE 4

| | | | Main scanning shape [mm] | | Sub-scanning shape [mm] |
|---|---|---|---|---|---|
| First lens incident surface | Light source side | R | −7.24E+02 | r | 0 |
| | | A1 | −2.57E−02 | B1 | 0 |
| | | A2 | −8.61E−03 | B2 | 0 |
| | | A3 | −1.46E−06 | B3 | 0 |
| | | A4 | −1.49E−06 | B4 | 0 |
| | | A5 | 4.17E−08 | B5 | 0 |
| | | A6 | 1.80E−09 | B6 | 0 |
| | | A7 | −1.17E−11 | B7 | 0 |
| | | A8 | −8.27E−13 | B8 | 0 |
| | | A9 | 1.86E−15 | B9 | 0 |
| | | A10 | −7.79E−17 | B10 | 0 |
| | Opposite side of light source | R | −7.24E+02 | r | 0 |
| | | A1 | −2.57E−02 | B1 | 0 |
| | | A2 | −8.61E−03 | B2 | 0 |
| | | A3 | 1.46E−06 | B3 | 0 |
| | | A4 | −1.59E−06 | B4 | 0 |
| | | A5 | 1.30E−08 | B5 | 0 |
| | | A6 | 9.81E−10 | B6 | 0 |
| | | A7 | −3.14E−12 | B7 | 0 |
| | | A8 | −7.94E−13 | B8 | 0 |
| | | A9 | 2.10E−14 | B9 | 0 |
| | | A10 | −3.21E−16 | B10 | 0 |
| First lens emitting surface | Light source side | R | −4.24E+01 | r | 0 |
| | | A1 | −4.09E−02 | B1 | 0 |
| | | A2 | −3.67E−03 | B2 | 0 |
| | | A3 | 2.89E−06 | B3 | 0 |
| | | A4 | 7.32E−07 | B4 | 0 |
| | | A5 | −2.93E−08 | B5 | 0 |

TABLE 4-continued

| | | | Main scanning shape [mm] | | Sub-scanning shape [mm] | |
|---|---|---|---|---|---|---|
| | | A6 | 2.23E−09 | B6 | 0 | |
| | | A7 | 2.13E−13 | B7 | 0 | |
| | | A8 | 5.40E−13 | B8 | 0 | |
| | | A9 | −5.67E−15 | B9 | 0 | |
| | | A10 | −2.19E−16 | B10 | 0 | |
| | Opposite side of light source | R | −4.24E+01 | r | 0 | |
| | | A1 | 4.09E−02 | B1 | 0 | |
| | | A2 | −3.67E−03 | B2 | 0 | |
| | | A3 | −2.89E−06 | B3 | 0 | |
| | | A4 | 1.34E−06 | B4 | 0 | |
| | | A5 | −1.72E−08 | B5 | 0 | |
| | | A6 | 1.62E−09 | B6 | 0 | |
| | | A7 | 3.48E−12 | B7 | 0 | |
| | | A8 | −2.20E−14 | B8 | 0 | |
| | | A9 | −6.07E−15 | B9 | 0 | |
| | | A10 | 2.31E−16 | B10 | 0 | |
| Second lens incident surface | Light source side | R | 8.53E+02 | r | −1.44E+02 | |
| | | A1 | −2.10E−02 | B1 | 2.46E−03 | |
| | | A2 | −4.26E−03 | B2 | 5.63E−04 | |
| | | A3 | 2.14E−05 | B3 | −1.29E−06 | |
| | | A4 | 5.62E−07 | B4 | −1.02E−06 | |
| | | A5 | −4.70E−09 | B5 | 2.85E−08 | |
| | | A6 | −2.99E−11 | B6 | −3.15E−10 | |
| | | A7 | −5.85E−14 | B7 | 8.85E−15 | |
| | | A8 | 1.99E−15 | B8 | 1.83E−14 | |
| | | A9 | 2.05E−17 | B9 | 7.92E−17 | |
| | | A10 | −1.89E−19 | B10 | −8.99E−19 | |
| | Opposite side of light source | R | 8.53E+02 | r | −1.44E+02 | |
| | | A1 | 2.10E−02 | B1 | −2.46E−03 | |
| | | A2 | −4.26E−03 | B2 | 5.63E−04 | |
| | | A3 | −2.14E−05 | B3 | −9.46E−06 | |
| | | A4 | 1.39E−06 | B4 | −8.32E−07 | |
| | | A5 | −8.02E−09 | B5 | 3.68E−08 | |
| | | A6 | −8.38E−11 | B6 | −5.01E−10 | |
| | | A7 | 3.63E−14 | B7 | −2.54E−13 | |
| | | A8 | 1.14E−14 | B8 | 5.16E−14 | |
| | | A9 | −6.14E−17 | B9 | 5.73E−17 | |
| | | A10 | −3.99E−20 | B10 | −4.56E−18 | |
| Second lens emitting surface | Light source side | R | 1.21E+02 | r | −2.25E+01 | |
| | | A1 | 1.29E−02 | B1 | 1.90E−05 | |
| | | A2 | −5.10E−03 | B2 | −1.41E−05 | |
| | | A3 | 6.90E−06 | B3 | −3.98E−06 | |
| | | A4 | −9.28E−07 | B4 | 1.46E−07 | |
| | | A5 | 6.75E−09 | B5 | −2.22E−09 | |
| | | A6 | 2.91E−11 | B6 | 1.43E−11 | |
| | | A7 | −1.53E−13 | B7 | 5.92E−14 | |
| | | A8 | −3.08E−15 | B8 | −3.19E−15 | |
| | | A9 | −5.61E−17 | B9 | 1.59E−17 | |
| | | A10 | 3.76E−19 | B10 | 2.24E−19 | |
| | Opposite side of light source | R | 1.21E+02 | r | −2.25E+01 | |
| | | A1 | −1.29E−02 | B1 | −1.90E−05 | |
| | | A2 | −5.10E−03 | B2 | −1.41E−05 | |
| | | A3 | −6.90E−06 | B3 | −7.08E−06 | |
| | | A4 | −3.81E−07 | B4 | 3.40E−07 | |
| | | A5 | −3.84E−09 | B5 | −7.03E−09 | |
| | | A6 | 1.11E−10 | B6 | 6.20E−11 | |
| | | A7 | −6.30E−14 | B7 | 1.47E−13 | |
| | | A8 | −1.19E−14 | B8 | −5.90E−15 | |
| | | A9 | 1.28E−17 | B9 | 2.78E−17 | |
| | | A10 | 1.25E−19 | B10 | −3.39E−20 | |

A light scanning unit including an image forming optical system designed as illustrated in Table 4 is designed in such a way that eccentric amounts of a flux-limiting element and a second scanning optical element are as given in Table 5 as follows.

TABLE 5

A case where a sub-scanning magnification of an image forming optical system is relatively high

| | |
|---|---|
| Sub-scanning magnification of entire optical system | 7.00 |
| Sub-scanning magnification of image forming optical system | 2.00 |

TABLE 5-continued

A case where a sub-scanning magnification of an image forming optical system is relatively high

| | |
|---|---|
| Magnification of incident optical system | 3.50 |
| Eccentric amount $X_L$ of second scanning optical element | −0.35 |
| Eccentric amount $X_S$ of flux-limiting element | 0.90 |
| Eccentric ratio of $X_L/X_S$ | −0.39 |

In Table 5, since the eccentric amount $X_L$ of the second scanning optical element 170 in the sub-scanning direction is −0.35 mm and the eccentric amount $X_S$ of the flux-limiting element 130 in the sub-scanning direction is 0.90 mm, the eccentric ratio of $X_L/X_S$ is −0.39, which is considered as satisfying Equation 2 as described above.

FIGS. 11 and 12 are graphs illustrating exemplary beam spot diameter characteristics of the light scanning unit 100 including an optical configuration as given in Tables 1, 4, and 5. In FIG. 11, a horizontal axis indicates positions of beam spots on a scanning target surface in a main scanning direction, and a vertical axis indicates diameters of the beam spots. Referring to FIG. 11, the light scanning unit 100 has a deviation between beam diameters of beam spots in an entire area of the scanning target surface in the main scanning direction within a range of approximately 1 μm. In FIG. 12, a horizontal axis indicates positions of beam spots on the scanning target surface in the main scanning direction, and a vertical axis indicates sizes of curvatures of image field of beam spots. Referring to FIG. 12, the light scanning unit 100 has a deviation between curvatures of image field of the beam spot diameters in the main scanning direction and the sub-scanning direction, the deviation being approximately 0.5 mm or less on the basis of a design image forming plane.

Figure 13:
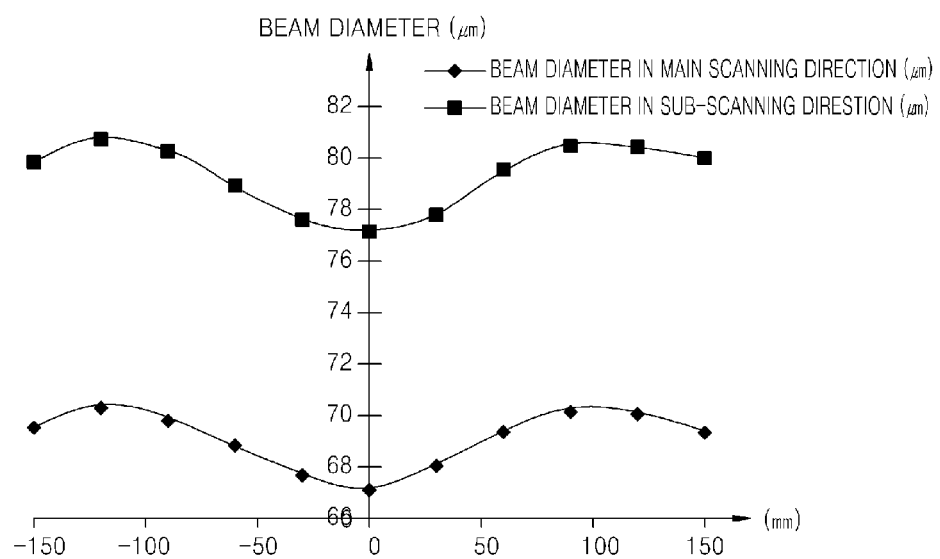
FIGS. 13 and 14 illustrate exemplary beam spot diameter characteristics of a light scanning unit.
Figure 14:
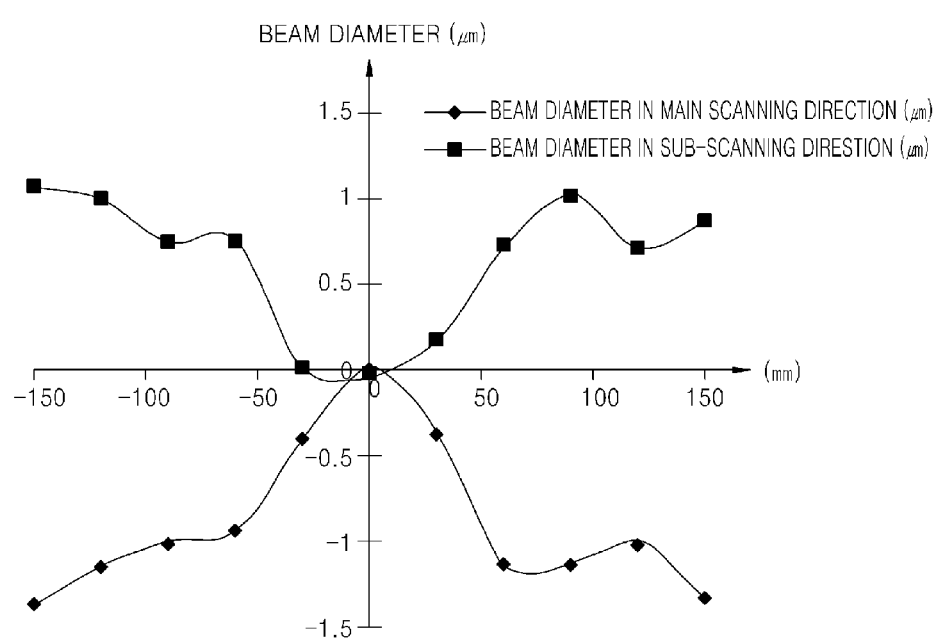

FIGS. 13 and 14 are graphs illustrating beam spot diameter characteristics of the light scanning unit according to the comparative example. The optical design of the light scanning unit according to the comparative example may be obtained when an eccentric amount of the flux-limiting element 130' is 0 instead of 0.90 mm, that is, the eccentric amount $X_S$ of the flux-limiting element in Table 5 and other design indexes are values as given in Tables 1, 4, and 5.

Referring to FIGS. 13 and 14, in a case of the comparative example, due to an effect of eccentrically arranging the second scanning optical element 170' with respect to the central optical axis C, a deviation of beam diameters in an image area is 4 μm, and a curvature of image field in an effective scanning area is increased as 1 mm or more in a main scanning direction and a sub-scanning direction.

That is, in a case of the light scanning unit according to the comparative example, though a ghost occurring due to multiple reflected light beams avoids the effective image area, the deviation between beam diameters is 4 μm, and the curvature of image field is 1 mm or more. However, in a case of the light scanning unit 100, the eccentric ratio $X_L/X_S$ of the second scanning optical element 170 to the flux-limiting element 130 is −1.43, thereby allowing the ghost occurring due to multiple reflected light beams to avoid the effective image area and reducing the deviation between beam diameters and the curvature of image field to 1 μm and 0.4 mm or less, respectively.

As given in Tables 3 and 5, the eccentric ratio of the second scanning optical element 170 to the flux-limiting element 130 is $X_L/X_S$ may vary with the size of the sub-scanning magnification of the image forming optical system. Substantially, the eccentric ratio of $X_L/X_S$ is increased when the size of the sub-scanning magnification of the image forming optical system is small, and the eccentric ratio of $X_L/X_S$ is decreased when the sub-scanning magnification of the image forming optical system is great. When the eccentric ratio of $X_L/X_S$ satisfies a numerical range of −1.8 to −0.2 as illustrated in Equation 2, it is possible not only to allow the ghost occurring due to multiple reflected light beams to avoid the effective image area but also to suppress the deviation of beam diameters and the deterioration of curvature of image field characteristics occurring according to an eccentric arrangement of the second scanning optical element 170.

According to an exemplary embodiment, the flux-limiting element 130 may be arranged between the collimating lens 120 and the cylindrical lens 140. According to an exemplary embodiment, the flux-limiting element 130 may be arranged in another position in the incident optical system, such as a position between the light source 110 and the collimating lens 120 or a position between the cylindrical lens 140 and the optical deflector 150.

According to an exemplary embodiment, the collimating lens 120 and the cylindrical lens 140 are provided, respectively. According to an exemplary embodiment, the collimating lens 120 and the cylindrical lens 140 may be formed in a single body to focus the flux of light in the sub-scanning direction and to allow the flux of light to be parallel light or convergent light in the main scanning direction.

According to an exemplary embodiment, the light scanning unit 100 includes one optical deflector 150 that deflects one light beam. However, the light scanning unit 100 is not limited thereto. For example, the light scanning unit 100 may be applied when multiple, e.g., two or four light beams are incident from different directions and deflected at the same time with respect to one optical deflector 150.

Figure 15:
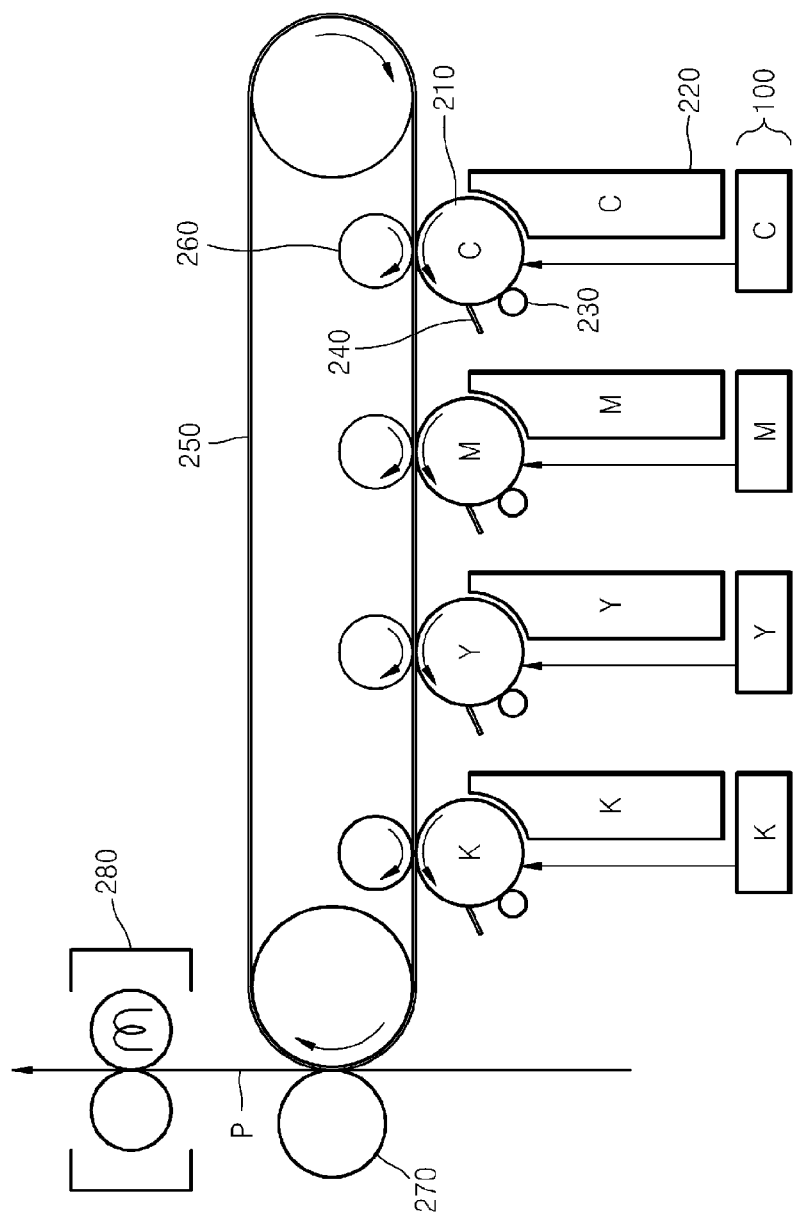
FIG. 15 illustrates an electrophotographic image forming apparatus including a light scanning unit according to an embodiment of the present general inventive concepts.

FIG. 15 is a configuration view schematically illustrating an electrophotographic image forming apparatus according to an embodiment of the present general inventive concept. The image forming apparatus of FIG. 15 is a dry electrophotographic image forming apparatus printing a color image using a dry developer (hereinafter, referred to as a toner).

The Image forming apparatus according to an exemplary embodiment may include the light scanning unit 100, a photosensitive drum 210, a developing unit 220, a charging roller 230, a transferring belt 250, a first transferring roller 260, a second transferring roller 270, and a fixing unit 280.

To print a color image, the light scanning unit 100, the photosensitive drum 210, and the developing unit 220 may be provided for each color, respectively. The light scanning unit 100 provided for each color may be the light scanning unit 100 according to the embodiments described above. The light scanning unit 100 scans four light beams to four photosensitive drums 210, respectively. The light scanning unit 100 may scan the four light beams to one optical deflector, in which the light scanning unit 100 may be used for the four photosensitive drums 210 and four developing units 220 in common.

The photosensitive drum 210 is an example of an image bearing member and may be formed of a cylindrical metal pipe with a photosensitive layer with a certain thickness formed on an outer circumferential surface thereof. An image bearing member (not shown) that is a photosensitive belt may be included. The outer circumferential surface of the photosensitive drum 210 may become the scanning target surface 180. The light scanning unit 100 exposes a scanning target surface of the photosensitive drum 210 in a longitudinal direction and the scanning target surface is transferred according to a rotation of the photosensitive drum 210 in a sub-scanning direction, thereby forming a two-dimensional electrostatic latent image on the scanning target surface of the photosensitive drum 210.

On the four photosensitive drums 210, there are formed, respectively, electrostatic latent images corresponding to image information of black K, magenta M, yellow Y, and cyan C. The four developing units 220 supply toners with colors of black K, magenta M, yellow Y, and cyan C to the four photosensitive drums 210, respectively, to form toner images with colors of black K, magenta M, yellow Y, and cyan C.

On the outer circumferential surface of the photosensitive drum 210, the charging roller 230 may be provided on top of the position exposed by the light scanning unit 100. The charging roller 230 is an example of a charging unit rotating while being in contact with the photosensitive drum 210 and charging a surface thereof with uniform electric potential. A charging bias may be applied to the charging roller 230. Instead of the charging roller 230, there a corona charging unit (not shown) may be used.

The transferring belt 150 is an example of a middle transferring member transferring a toner image of the photosensitive drum 210 to a printing medium P. Instead of the transferring belt 250, a middle transferring drum may be used as a middle transferring member. The transferring belt 250 is driven while being in contact with the photosensitive drums 210. The toner images with colors of black K, magenta M, yellow Y, and cyan C formed on the photosensitive drums 210 are transferred to the transferring belt 250 while being overlapped with one another by a first transferring bias applied to the first transferring roller 260. On the bottom of a position on the circumferential surface of the photosensitive drum 210, the position where a transfer is performed, there may be provided a cleaning unit 240. Residual toner images after transfer are moved by the cleaning unit 240. The toner image transferred to the transferring belt 250 is transferred to the printing medium P by a second transferring bias applied to the second transferring roller 270.

The printing medium P where the toner image is transferred is sent to the fixing unit 280. The toner image transferred to the printing medium P receives heat and pressure from a fixing nip of the fixing unit 280 and is fixed to the printing medium P, thereby completing printing.

According to an exemplary embodiment, the image forming apparatus forms a color image, however, an exemplary present embodiment is not limited thereto. For example, when forming a monochromatic image in black and white, the image forming apparatus may include only single ones of the light scanning unit 100, the photosensitive drum 210, and the developing unit 220 only. According to an exemplary embodiment, the image forming apparatus, includes a light scanning unit 100, the photosensitive drum 210, the developing unit 220, the transferring belt 250, the first and second transferring roller 260 and 270, and the fixing unit 280. According to an exemplary embodiment, other types of printing units, for example, transferring a toner image on a printing medium by electrophotographic method, may be employed in the imager forming apparatus.

The light scanning unit and the electrophotographic image forming apparatus including the light scanning unit according to the described embodiments may allow multiple reflected light beams between incident and emitting surfaces of the light scanning unit to avoid an effective image area without a deterioration of image quality and an increase of manufacturing costs for light scanning units.

While the present general inventive concept has been particularly shown and described with reference to exemplary embodiments thereof, it will be understood by those of ordinary skill in the art that various changes in form and details may be made therein without departing from the spirit and scope of the present general inventive concept as defined by the following claims.

What is claimed is:

1. A light scanning unit capable of scanning light beams to a scanning target surface, the light scanning unit comprising:
   a light source emitting the light beams according to an image signal;
   an incident optical system comprising a flux-limiting element limiting a flux of light beams emitted by the light source;
   an optical deflector deflecting the light beams emitted by the light source in a main scanning direction; and
   an image forming optical system comprising one or a plurality of scanning optical elements imaging the light beams deflected by the optical deflector on the scanning target surface,
   wherein at least one scanning optical element of the one or the plurality of scanning optical elements of the image forming optical system is eccentrically arranged from a central optical axis of the image forming optical system in a sub-scanning direction, and
   wherein the flux-limiting element is eccentrically arranged from a central optical axis of the incident optical system in a sub-scanning direction in order to compensate for a deterioration of beam spot diameter occurring due to the scanning optical elements eccentrically arranged in the image forming optical system.

2. The light scanning unit of claim 1, wherein an eccentric direction of the flux-limiting element is opposite to an eccentric direction of the scanning optical element eccentrically arranged in the image forming optical system.

3. The light scanning unit of claim 1, wherein the scanning optical element eccentrically arranged in the image forming optical system is most adjacent to the scanning target surface among the one or a plurality of scanning optical elements of the image forming optical system.

4. The light scanning unit of claim 1, wherein an eccentric amount $X_S$ of the flux-limiting element in the sub-scanning direction and an eccentric amount $X_L$ of the scanning optical element eccentrically arranged in the image forming optical system satisfy the following Equation:

$$-1.8 < \frac{X_L}{X_S} < -0.2.$$

5. The light scanning unit of claim 1, wherein the flux-limiting element is eccentrically arranged in such a way that an incident angle θ of the light beams incident to the optical deflector satisfies the following Equation:

$$0.2 < |\theta| < 1.6.$$

6. The light scanning unit of claim 1, wherein the incident optical system further comprises:
   a collimating lens collimating the light beams emitted by the light source as parallel light or convergent light, and
   a cylindrical lens focusing the light beams passing through the collimating lens onto a deflecting surface of the optical deflector in the sub-scanning direction.

7. The light scanning unit of claim 6, wherein the flux-limiting element is arranged in one of a position between the light source and the collimating lens, a position between the collimating lens and the cylindrical lens, and a position between the cylindrical lens and the optical deflector.

8. The light scanning unit of claim 1, wherein the image forming optical system comprises:
   a first scanning optical element that is adjacent to the optical deflector and has a refractive power of 0 in the sub-scanning direction, and
   a second scanning optical element that images the light beams passing through the first scanning optical element on the scanning target surface and has a refractive power in the sub-scanning direction, the refractive power being needed in the image forming optical system,
   wherein the scanning optical element eccentrically arranged in the image forming optical system is the second scanning optical element.

9. The light scanning unit of claim 1, wherein the one or a plurality of scanning optical elements comprise fθ characteristics of imaging the light beams deflected by the optical deflector on the scanning target surface at a constant velocity.

10. A light scanning unit capable of scanning light beams to a scanning target surface, the light scanning unit comprising:
    a light source emitting the light beams according to an image signal;
    a collimating lens collimating the light beams emitted by the light source as parallel light or convergent light;
    a cylindrical lens focusing the light beams passing through the collimating lens onto a deflecting surface of the optical deflector in a sub-scanning direction;
    an optical deflector deflecting the light beams emitted by the light source in a main scanning direction;
    a flux-limiting element arranged in one of a position between the light source and the collimating lens, a position between the collimating lens and the cylindrical lens, and a position between the cylindrical lens and the optical deflector and limiting the flux of light beams emitted by the light source; and
    one or a plurality of scanning optical elements imaging the light beams deflected by the optical deflector on the scanning target surface,
    wherein a scanning optical element most adjacent to the scanning target surface among the one or a plurality of scanning optical elements is eccentrically arranged from a central light axis of an image forming optical system of the light scanning unit in a sub-scanning direction, and
    wherein the flux-limiting element is eccentrically arranged from a central light axis of an incident optical system in a sub-scanning direction opposite to an eccentric direction of the scanning optical element eccentrically arranged in the image forming optical system.

11. The light scanning unit of claim 10, wherein an eccentric amount $X_S$ of the flux-limiting element in the sub-scanning direction and an eccentric amount $X_L$ of the scanning optical element eccentrically arranged in the image forming optical system satisfy the following Equation:

$$-1.8 < \frac{X_L}{X_S} < -0.2.$$

12. The light scanning unit of claim 10, wherein the flux-limiting element is eccentrically arranged in such a way that an incident angle θ of the light beams incident to the optical deflector satisfies the following Equation, $$0.2 < |\theta| < 1.6.$$

13. An electrophotographic image forming apparatus comprising:
    an image bearing member;
    a light scanning unit comprising a light source emitting the light beams according to an image signal, an incident optical system comprising a flux-limiting element limiting the flux of light beams emitted by the light source, an optical deflector deflecting the light beams emitted by the light source in a main scanning direction, and an image forming optical system comprising one or a plurality of scanning optical elements imaging the light beams deflected by the optical deflector on a scanning target surface, the light scanning unit forming an electrostatic latent image by scanning the light beams to the scanning target surface of the image bearing member; and a developing unit developing the electrostatic latent image formed on the image bearing member by supplying a toner thereto, wherein at least one scanning optical element of the one or plurality of scanning optical elements of the image forming optical system is eccentrically arranged from a central optical axis of the image forming optical system in a sub-scanning direction, and wherein the flux-limiting element is eccentrically arranged from a central optical axis of the incident optical system in a sub-scanning direction in order to compensate for a deterioration of beam spot diameter occurring due to the scanning optical elements eccentrically arranged in the image forming optical system.

14. The image forming apparatus of claim 13, wherein an eccentric direction of the flux-limiting element is opposite to an eccentric direction of the scanning optical element eccentrically arranged in the image forming optical system.

15. The image forming apparatus of claim 13, wherein the scanning optical element eccentrically arranged in the image forming optical system is most adjacent to the scanning target surface among the one or a plurality of scanning optical elements of the image forming optical system.

16. The image forming apparatus of claim 13, wherein an eccentric amount $X_S$ of the flux-limiting element in the sub-scanning direction and an eccentric amount $X_L$ of the scanning optical element eccentrically arranged in the image forming optical system satisfy the following Equation:

$$-1.8 < \frac{X_L}{X_S} < -0.2.$$

17. The image forming apparatus of claim 13, wherein the flux-limiting element is eccentrically arranged in such a way that an incident angle θ of the light beams incident to the optical deflector satisfies the following Equation:

$$0.2 < |\theta| < 1.6.$$

18. The light scanning unit of claim 13, wherein the incident optical system further comprises:
a collimating lens collimating the light beams emitted by the light source as parallel light or convergent light; and
a cylindrical lens focusing the light beams passing through the collimating lens onto a deflecting surface of the optical deflector in the sub-scanning direction.

19. The light scanning unit of claim 18, wherein the flux-limiting element is arranged in one of a position between the light source and the collimating lens, a position between the collimating lens and the cylindrical lens, and a position between the cylindrical lens and the optical deflector.

20. The light scanning unit of claim 13, wherein the image forming optical system comprises:
a first scanning optical element that is adjacent to the optical deflector and has a refractive power of 0 in the sub-scanning direction, and
a second scanning optical element that images the light beams passing through the first scanning optical element on the scanning target surface and has a refractive power in the sub-scanning direction, the refractive power being needed in the image forming optical system,
wherein the scanning optical element eccentrically arranged in the image forming optical system is the second scanning optical element.

* * * * *